US005096407A

United States Patent [19]

Nebeling

[11] Patent Number: 5,096,407

[45] Date of Patent: Mar. 17, 1992

[54] FLUTED ROLLER FOR A SINGLE FACE CORRUGATOR

[75] Inventor: Robert L. Nebeling, Wayne, N.J.

[73] Assignee: Peters Maschinenfabrik GmbH, Hamburg, Fed. Rep. of Germany

[21] Appl. No.: 364,328

[22] Filed: Jun. 8, 1989

[30] Foreign Application Priority Data

Jun. 18, 1988 [DE] Fed. Rep. of Germany ....... 3820702

[51] Int. Cl.[5] ............................................ B29B 11/00

[52] U.S. Cl. .................................. 425/369; 29/121.4; 29/121.6; 29/121.8; 156/470

[58] Field of Search .................... 29/110, 121.1, 121.2, 29/121.4, 121.6, 121.8, 129.5; 72/180, 199; 156/470, 598; 425/336, 369

[56] References Cited

U.S. PATENT DOCUMENTS

| | | | |
|---|---|---|---|
| 1,130,911 | 3/1915 | Loomis | 29/110 |
| 1,150,805 | 8/1915 | Beran | 425/369 X |
| 2,570,470 | 10/1951 | Meyer et al. | 29/121.4 X |
| 3,056,164 | 10/1962 | Reichel et al. | 29/121.6 X |
| 4 021,894 | 5/1977 | Poterala et al. | 29/121.4 X |
| 4,154,565 | 5/1979 | Hyde et al. | 425/369 |
| 4,261,784 | 4/1981 | Saito | 156/389 |
| 4,310,375 | 1/1982 | Seki | 29/110 X |
| 4,338,154 | 7/1982 | Berthelot et al. | 425/369 X |
| 4,363,616 | 12/1982 | Thomas | 425/369 X |
| 4,368,094 | 1/1983 | Mayer et al. | 156/462 |
| 4,381,212 | 4/1983 | Roberts | 29/125 X |
| 4,689,174 | 8/1987 | Lupke | 156/470 X |
| 4,832,186 | 5/1989 | Conrad | 29/121.4 X |

FOREIGN PATENT DOCUMENTS

| | | |
|---|---|---|
| 0009907 | 12/1982 | European Pat. Off. . |
| 0025759 | 1/1984 | European Pat. Off. . |
| 2840150 | 5/1981 | Fed. Rep. of Germany . |
| 2713464 | 11/1981 | Fed. Rep. of Germany . |
| 2951774 | 7/1984 | Fed. Rep. of Germany . |

*Primary Examiner*—Mark Rosenbaum
*Assistant Examiner*—Frances Chun
*Attorney, Agent, or Firm*—Brown, Martin Haller & McClain

[57] ABSTRACT

Fluted roller for a single face corrugator comprising grooves extending around the periphery thereof, the bottom of the grooves being deeper than the bottoms of the corrugation of the fluted roller, wherein the grooves extend at an angle unlike 90° to a surface line of the roller running parallel to the axis thereof.

9 Claims, 3 Drawing Sheets

Fig. 4
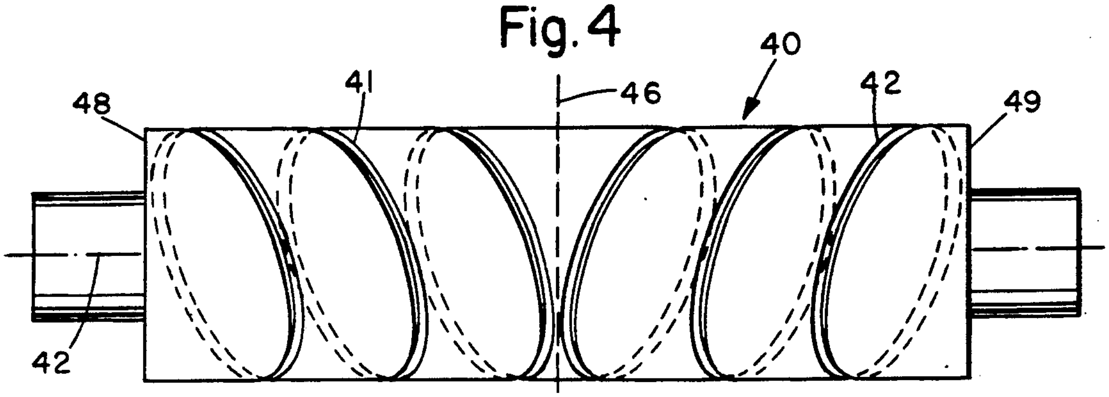
Fig. 5
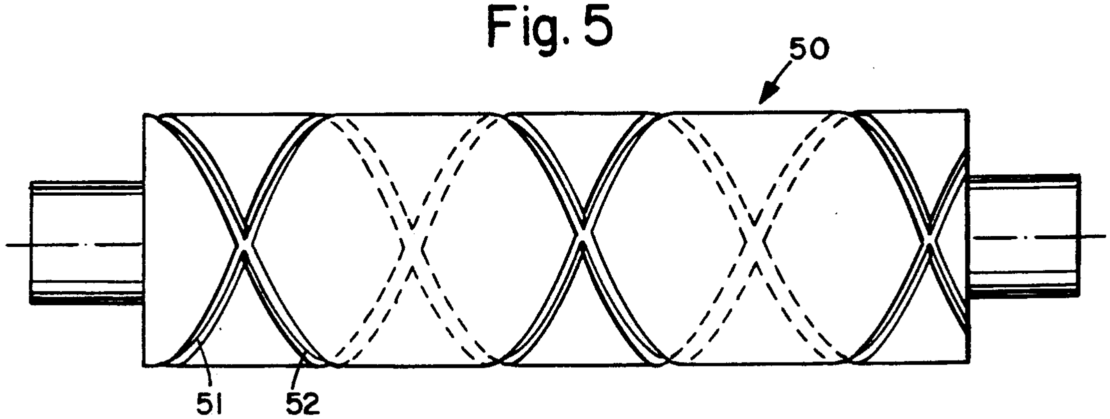
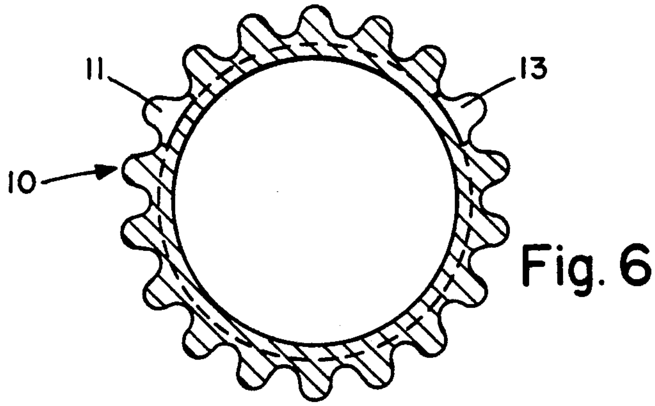
Fig. 6

FLUTED ROLLER FOR A SINGLE FACE CORRUGATOR

BACKGROUND OF THE INVENTION

As is known, two fluted rollers cooperate in single face corrugators, a paper web being corrugated between the fluted rollers by a mostly plastic deformation. A press roller cooperates with the lower fluted roller, the press roller pressing the fed covering web against the corrugated web the tips of the corrugations thereof having been applied with glue beforehand. In the peripheral area of the lower fluted roller between the stamping engagement with the upper fluted roller and the press roller, care must be taken that by maintaining the shape of the corrugations, the corrugated web will smoothly abut against the corrugations of the lower fluted roller. Older single face corrugators used so-called fingers which are thin sheet metal plates which externally surround the mentioned area of the lower fluted roller in form of a half moon at axial distances. For this purpose, the upper fluted roller is comprised with annular grooves which the fingers engage. Such annular grooves of the upper fluted roller have the drawback that they lead to a corresponding deformation of the surface of the lower fluted roller. Therefore, it is necessary to adjust the fluted rollers from time to time axially towards each other in order to make the wear more even.

Modern single face corrugators are so-called fingerless machines. It is known from German patent letter 2 840 150 to arrange a vacuum chamber along the outer peripheral area of the lower fluted roller which is not covered by the corrugated cardboard web. Thereby, also a vacuum in the peripheral area of the lower fluted roller which the corrugated cardboard web engages is created through axially spaced annular grooves in the fluted roller. It is also known from German patent letter 2 713 464 to create such a vacuum in the annular grooves in that the lower fluted roller comprises an inner passage connected to the vacuum source, the passage being connected to the annular grooves by radial bores. In the peripheral area of the fluted roller not covered by the corrugated cardboard web again fingers are arranged in the annular grooves in order to prevent a "short circuit" of the vacuum. In contrast to the finger machine wherein the guiding sleets are subject to considerable wear and therefore have to be frequently replaced, the fingers define only a sealing in the machine described last which will result in a much lower wear. It is also known from German patent letter 2 951 774 to provide a plurality of longitudinal bores parallel to the axis instead of a central passage in the lower fluted roller, the longitudinal bores being connected to the annular grooves by radial bores. It is also known from European patent letter 0 009 907 to locate such axially parallel suction passages such that they intersect with the annular grooves.

In an inversion of the vacuum principle, it is known from U.S. Pat. No. letter 4 261 784 to associate a pressure chamber with the area of the lower fl ted roller which is surrounded by the corrugated cardboard web in order to press the corrugated cardboard web against the surface of the fluted roller. For producing a corresponding differential pressure, the lower fluted roller again is comprised with axially spaced annular grooves. It is also known from U.S. Pat. No. letter 4 368 094 to have nozzles engage annular grooves of the lower fluted roller, the nozzles being connected to a vacuum source.

In all mentioned cases, therefore, one of the two fluted rollers is comprised of annular grooves which have depths greater than the depths of the corrugations through which they run. Such annular grooves, however, may result in a quality deterioration of the corrugated cardboard. The corrugated cardboard web to be formed between the fluted rollers is subject to a significant tension. Therefore, the web is deformed into the annular grooves in the area thereof. In this area subsequently no gluing to the covering web will occur. Furthermore, the stability of the corrugated cardboard is weakened along the corrugations.

Now it is known from European Pat. letter No. 0 025 759 to provide short slots instead of throughgoing annular grooves, the slots being annularly arranged at the periphery of the lower fluted roller and to connect the slots alternately with vacuum or pressure passages, respectively. Also with such slots the web is being deformed into the slots by its inherent tension, however, not continuously like in the continuously extending annular grooves. On the other side, such a fluted roller comprises other disadvantages. Naturally dust and dirt will collect in the annular grooves and also in the slots after a certain time of operation whereby the function of the grooves and slots is impaired. Therefore, the fluted roller has to be cleaned from time to time. A cleaning of the slots, however, is very time-consuming. The production of a fluted roller with slots is also expensive as these will have to be separately milled piece by piece. The necessary chromium plating of such a fluted roller is also expensive as shutters have to be inserted into single slots in order to leave the slots free.

Therefore, it is an object of the invention to provide a fluted roller for a single face corrugator which reduces the impairment of the corrugated cardboard by necessary grooves to a minimum value without influencing the function of the grooves or the fluted roller, respectively.

BRIEF SUMMARY OF THE INVENTION

In the fluted roller according to the invention, the groove through which the vacuum is supplied, for example in a fingerless machine, will no longer extend perpendicularly to a surface line running parallel to the axis as in prior art but at an oblique angle relative to the corrugations. As in for prior art, the groove is of greater depth than the lowest point of the roller corrugations. There are several possibilities to attain such a course of the groove. According to one embodiment of the inventions a helical groove is formed running either from the longitudinal center line toward both ends of the roller or running from one end to the other. The helical groove configuration may also be include a double or multi-helical grooves. A further possibility is to provide annular grooves as in the prior art, but to arrange these annular grooves obliquely to the axis of the roller. According to a further embodiment of the invention are at grooves may also be arranged such that they are at opposite inclinations emanating from both sides of the longitudinal center line, for example, the annular grooves on the left side of the longitudinal center line are at a 50° angle to the left while the grooves on the right side are at a 50° angle to the right. Finally, helical or annular grooves may also intersect, as an example, annular grooves may be provided which intersect in pairs.

The advantage of the simple clearing operation as in prior art annular grooves is maintained in the fluted rollers according to the present invention. However, the drawbacks associated with the prior art annular grooves are prevented to a high degree. By the oblique course of the annular grooves relative to the web direction, only are insignificant deformation of the web in the area of the groove will occur, if any, such that the impairment of the corrugated cardboard quality caused by a weak line of webbing is avoided Even a small amount of deformation would not create a disadvantage insofar as it would not be on a continuous line parallel to the longitudinal axis of the web, but oblique in relation thereto.

Therefore, for example, the problem of a continuous deformation extending parallel to a bending or scoring line of a folding carton, which weakens the carton will be eliminated.

The production of the fluted roller according to the invention is no more expensive than that of prior art fluted rollers with annular grooves and less expensive than that of fluted rollers with annularly arranged slots. Furthermore, the fluted roller according to the invention has an increased bending stability versus prior art fluted rollers with annular grooves.

The upper and lower fluted rollers normally have a different number of teeth in known rollers, the meshing of the two rollers results in wearing of the roller so that annularly arranged humps are formed at the tips of the flutes opposite the groove as a result of the absence of abrasion at that point. The roller according to the present invention avoids uneven wear and consequential formation of the humps. A single point of a flute is not constantly meeting the same position of the groove in every rotation due to unequal number of teeth in the upper and lower fluted rollers. The wear of the counter roller will become actually more uniform so that the axial displacement of a fluted roller from time to time to even out the wear will no longer be necessary. The effect as described will result in a higher machine life. Above all, the disadvantageous phenomena are avoided which resulted from humps on the tips of the flutes which led to a deterioration of the corrugated cardboard quality. The fluted roller according to the invention is suited for all types of corrugators hitherto known in an advantageous way which means as well for finger machines and for fingerless machines.

BRIEF DESCRIPTION OF THE DRAWINGS

The invention will now be explained referring to drawings in which

FIGS. 1 to 5 illustrate in a diagrammatic way different embodiments of fluted rollers according to the invention;

FIG. 6 is a cross-sectional view taken on line 6—6 of FIG. 1.

DETAILED DESCRIPTION OF THE PREFERRED EMBODIMENTS

Figure 1:
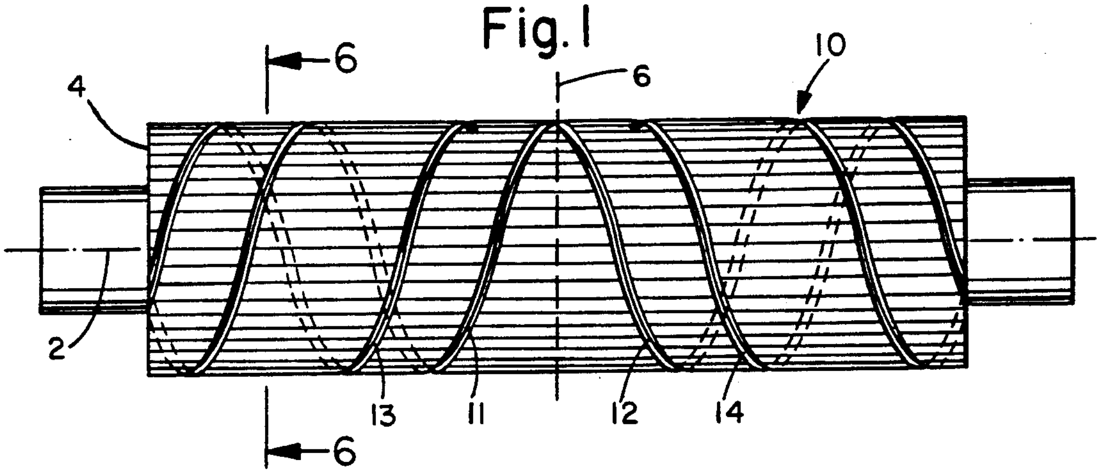

Before referring more closing to details illustrated in the drawings, it is stated that each of the features described per se or in combination with features of the claims is of significance for the invention.

Figure 7:
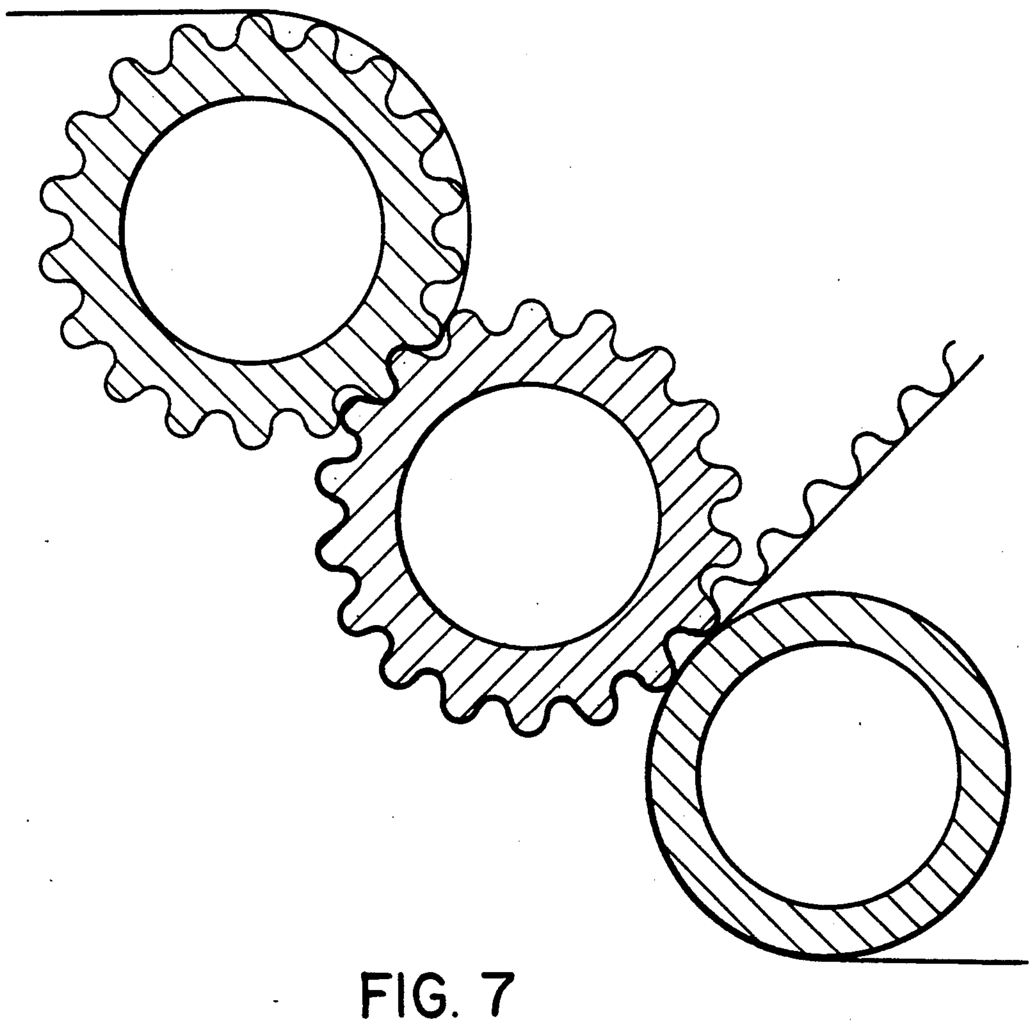
FIG. 7 PRIOR ART
FIG. 7 is an end view of the rollers of a single face corrugator according to the prior art.

A single face corrugator as known in the prior art is illustrated in FIG. 7 to indicate the interaction of two fluted rollers and the press roller. For a finger-type corrugator the upper fluted roller will be made according to the present invention. For a fingerless corrugator, the lower fluted roller will be configured according to the present invention.

FIG. 1 illustrates a fluted roller 10, for instance the lower fluted roller of a fingerless single face corrugator comprising the common corrugated ridges 4 which run parallel to axis 2. Extending from the longitudinal center line 6 to the left and to the right are helical grooves 11, 12, respectively, with a predetermined pitch. Further, helical grooves 13, 14 extend on both sides from the longitudinal center line which have same pitch as the grooves 11, 12, but are offset in peripheral direction to create parallel helices. The form of the grooves through which a vacuum may be channeled to hold the web against the fluted roller 10, resembles the usual grooves in fluted rollers, which are recessed from the outer surfaces of the ridges 4 so that the groove depth is deeper than the corrugation depth.

Figure 2:
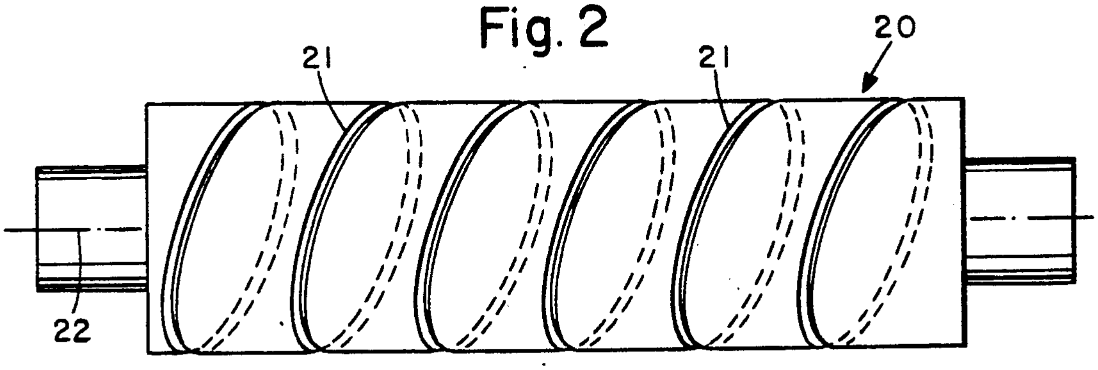

FIG. 2 illustrates a fluted roller 20 comprising a line of axially evenly spaced annular grooves 21 which extend at an oblique angle to the corrugated ridges (not shown) parallel to the axis 22.

Figure 3:
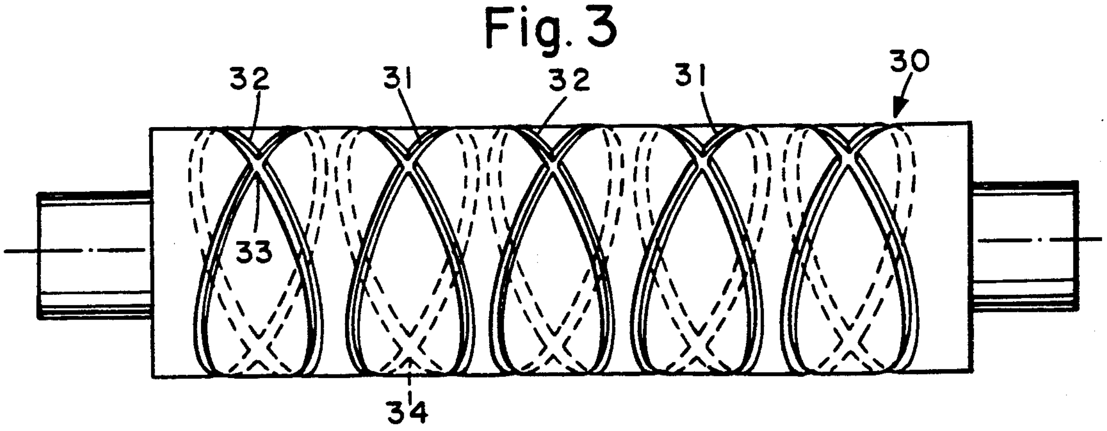

In the fluted roller 30 in FIG. 3, a first set of annular grooves 31 is provided, the arrangement of which is similar to that of the grooves 21 in FIG. 2. A second set of annular grooves 32 is formed with the opposite inclination as grooves 31 and arranged such that the grooves 31, 32 intersect at diametrically opposite points 33 and 34.

In the example in FIG. 4, a fluted roller 40 comprises annular grooves 41, 42 on both sides of the longitudinal center line 46. The annular grooves 41, 42 have an opposite pitch relative to each other and may be evenly spaced running from the longitudinal centerline 46 toward respective ends 48 and 49.

The annular grooves in the FIGS. 2 to 4 are closed loops, which facilitates cleaning by means of a clearing device such as a brush inserted into the grooves, the cleaning device going through a reciprocating movement parallel to the axis while rotating the fluted roller. In a helical groove as shown in FIG. 1, the cleaning device may also move parallel to the axis during the rotation of the roller starting at centerline 6, after reaching at one end of the roller, the direction of rotation of the roller will be reversed after being reseated in another groove. However, a thread-like course is possible in which the cleaning member will be automatically reversed at one end and will move axially into the opposite direction.

FIG. 5 shows two helical grooves 51, 52 running from end 58 to end 59 in a fluted roller 50 with identical but opposite pitch.

The pitch of the grooves of the corresponding fluted rollers will be selected to extend at an angle which corresponds to the direction of the tensional force o the paper web as it is fed into and away from the roller. Deformation of the paper web into the grooves, therefore, will no longer occur, or will occur to a limited insignificant extent only.

I claim:

1. A fluted roller for a single face corrugator for forming corrugated paper wherein an upper fluted roller meshes with a lower fluted roller which cooperates with a press roller, one of said upper and lower fluted rollers comprising:

a cylinder having an axis, a longitudinal center line and a periphery, said cylinder having a plurality of corrugations parallel to said axis, each corrugation comprising a ridge and a valley, said valley having a first depth;

at least one groove extending around said periphery, said groove having a pitch at an oblique angle relative to said plurality of corrugations, said groove having a second depth greater than said first depth so that said corrugated paper experiences an insignificant deformation of its web caused by said groove.

2. A fluted roller as in claim 1 wherein said fluted roller is said upper fluted roller sand said single face corrugator has a plurality of fingers which engage a plurality of said grooves for holding said corrugated paper against said fluted roller.

3. A fluted roller as in claim 1 wherein said fluted roller is said lower fluted roller and at least one said groove directs a vacuum for holding said corrugated paper against said fluted roller.

4. A fluted roller as claimed in claim 1, wherein said groove comprises a helical groove.

5. A fluted roller as claimed in claim 4, wherein said helical groove comprises a plurality of helical grooves.

6. A fluted roller as claimed in claim 5, wherein said pitch of a first helical groove is opposite said pitch of a second helical groove.

7. A fluted roller as claimed in claim 1, wherein said groove comprises a plurality of axially spaced annular grooves having a pitch.

8. A fluted roller as claimed in claim 7, wherein said pitch of said plurality of annular grooves on a first half of said cylinder divided at said longitudinal center line have a first inclination and said pitch of said plurality of annular grooves on a second half of said cylinder have a second inclination which is opposite said first inclination.

9. A fluted roller as claimed in claim 7, wherein a first annular groove and a second annular groove have opposite inclinations before intersecting each other.

* * * * *

UNITED STATES PATENT AND TRADEMARK OFFICE
CERTIFICATE OF CORRECTION

PATENT NO. : 5,096,407

DATED : March 17, 1992

INVENTOR(S) : Robert L. Nebeling

It is certified that error appears in the above-identified patent and that said Letters Patent is hereby corrected as shown below:

Column 5, Line 17 "roller sand said" should read --roller and said--.

Signed and Sealed this

First Day of June, 1993

*Attest:*

MICHAEL K. KIRK

*Attesting Officer*

*Acting Commissioner of Patents and Trademarks*